(12) United States Patent
Kim et al.

(10) Patent No.: US 12,027,865 B2
(45) Date of Patent: Jul. 2, 2024

(54) BATTERY CHARGING APPARATUS (71) Applicants: HYUNDAI MOTOR COMPANY, Seoul (KR); KIA CORPORATION, Seoul (KR)

(72) Inventors: Jae Hyun Kim, Incheon (KR); Dong Gyun Woo, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/099,531

(22) Filed: Jan. 20, 2023

(65) Prior Publication Data

US 2024/0063640 A1 Feb. 22, 2024

(30) Foreign Application Priority Data

Aug. 17, 2022 (KR) .................. 10-2022-0102853

(51) Int. Cl.
| | |
|---|---|
| *H02J 3/32* | (2006.01) |
| *B60L 55/00* | (2019.01) |
| *H02J 3/16* | (2006.01) |
| *H02J 7/02* | (2016.01) |
| *H02M 1/00* | (2007.01) |
| *H02M 3/335* | (2006.01) |

(52) U.S. Cl.
CPC .............. *H02J 3/322* (2020.01); *B60L 55/00* (2019.02); *H02J 3/16* (2013.01); *H02J 7/02* (2013.01); *H02M 1/0009* (2021.05); *H02M 1/0043* (2021.05); *H02M 3/33584* (2013.01); *B60L 2210/10* (2013.01); *H02J 2207/20* (2020.01)

(58) Field of Classification Search
CPC ...... H02J 3/322; H02J 3/16; H02J 7/02; H02J 2207/20; B60L 55/00; B60L 2210/10; H02M 1/0043; H02M 1/0009; H02M 3/33584

See application file for complete search history.

(56) References Cited

U.S. PATENT DOCUMENTS

2011/0149606 A1* 6/2011 Ho .................... B60L 53/20
363/17

* cited by examiner

*Primary Examiner* — Carlos Amaya
(74) *Attorney, Agent, or Firm* — Lempia Summerfield Katz LLC (57) ABSTRACT

A battery charging apparatus includes a bi-directional charger including a first switching circuit connected to an AC terminal, a second switching circuit connected to a battery, and a transformer connected between the first switching circuit and the second switching circuit. The battery charging apparatus also includes a controller configured to switch a leg included in the first switching circuit based on a first carrier wave and a first duty command, configured to switch a leg included in the second switching circuit based on a second carrier wave and a second duty command, configured to adjust a phase of the second carrier wave compared to a phase of the first carrier wave by a phase shift angle according to an active power command, and configured to adjust a phase of the second duty command according to the reactive power command.

20 Claims, 12 Drawing Sheets

BATTERY CHARGING APPARATUS

CROSS REFERENCE TO RELATED APPLICATION

The present application claims priority to Korean Patent Application No. 10-2022-0102853, filed on Aug. 17, 2022, the entire contents of which are incorporated herein by reference.

BACKGROUND

Field

The present disclosure relates to a battery charging apparatus configured to bi-directionally transfer electric energy between external power/external load and a battery.

Description of the Related Art

Recently, with the global trend toward a reduction in carbon dioxide emissions, demand for electric-motored vehicles that generate driving power by driving a motor with electric energy stored in an energy storage device such as a battery is significantly increasing, instead of typical internal-combustion-engine vehicles that generate driving power through the combustion of fossil fuel.

The electric-motored vehicle is provided with an On Board Charger (OBC) that charges the battery from a system power source. In particular, the electric-motored vehicle may perform a Vehicle to Grid (V2G) mode and a Vehicle to Load (V2L) mode that supplies energy stored in the battery through a bi-directional OBC to the system power source and an electric load.

The foregoing is intended merely to aid in the understanding of the background of the present disclosure and is not intended to mean that the present disclosure falls within the purview of the related art that is already known to those having ordinary skill in the art.

SUMMARY

Accordingly, the present disclosure has been made keeping in mind the above problems occurring in the related art. An objective of the present disclosure is to provide a battery charging apparatus configured to control the active power component and reactive power component of apparent power in a bi-directional charger.

The present disclosure is not limited to the above-mentioned objective. Other objectives of the present disclosure should be clearly understood by those having ordinary skill in the art from the following description.

In one embodiment of the present disclosure, a battery charging apparatus includes: a bi-directional charger including a first switching circuit connected to an AC terminal, a second switching circuit connected to a battery, and a transformer connected between the first switching circuit and the second switching circuit. The battery charging apparatus also includes a controller configured to switch a leg included in the first switching circuit based on a first carrier wave and a first duty command. The controller is also configured to switch a leg included in the second switching circuit based on a second carrier wave and a second duty command. The controller is also configured to adjust a phase of the second carrier wave compared to a phase of the first carrier wave by a phase shift angle according to an active power command. The controller is also configured to adjust a phase of the second duty command according to the reactive power command.

In another embodiment of the present disclosure, a bi-directional charger includes: a first switching circuit connected to an AC terminal, a second switching circuit connected to a battery, and a transformer connected between the first switching circuit and the second switching circuit. The bi-directional charger also includes a controller configured to switch a leg included in the first switching circuit based on a first carrier wave and a first duty command. The controller is further configured to switch a leg included in the second switching circuit based on a second carrier wave and a second duty command. The controller is further configured to adjusting a phase of the second carrier wave compared to a phase of the first carrier wave by a phase shift angle according to an active voltage command. The controller is further configured to adjust a phase of the second duty command according to the reactive voltage command.

According to the present disclosure, it is possible to control the active power component and reactive power component of apparent power in a bi-directional charger, by adjusting the phase of a carrier wave for pulse width modulation (PWM) control in a phase shift control method according to an active power command and adjusting the phase of a duty command indicating a switching duty according to a reactive power command.

Further, according to the present disclosure, it is possible to alleviate the instability of current generated when the phase of a duty command is adjusted according to a reactive power command, by setting the polarity of a phase shift angle according to an active power command to be the same as the polarity of instantaneous power for an AC terminal of the bi-directional charger.

The present disclosure is not limited to the above-mentioned effects. Other effects of the present disclosure should be clearly understood by those having ordinary skill in the art from the following description.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Hereinafter, an embodiment of the present disclosure is explained in detail with reference to the accompanying drawings. The same reference numerals are used throughout the drawings to designate the same or similar components.

When it is determined that the detailed description of the known art related to the present disclosure may obscure the gist of the disclosure, the detailed description thereof has been omitted. Further, it should be understood that the accompanying drawings are merely for making those having ordinary skill in the art easily understand embodiments disclosed herein, and the present disclosure is intended to cover not only embodiments disclosed herein, but also various alternatives, modifications, equivalents and other embodiments that fall within the spirit and scope of the present disclosure.

In the description of the following embodiments, the term "preset" means that the value of a parameter is predetermined, when the parameter is used in a process or algorithm. The value of the parameter may be set when the process or algorithm is started or while the process or algorithm is being performed, according to an embodiment.

Although the terms "first", "second", etc. may be used herein to describe various elements, these elements should not be limited by these terms. These terms are only used to distinguish one element from another element.

It should be understood that when an element is referred to as being "coupled" or "connected" to another element, the element can be directly coupled or connected to the other element or intervening elements may be present therebetween. In contrast, it should be understood that when an element is referred to as being "directly coupled" or "directly connected" to another element, there are no intervening elements present.

Herein, the singular forms are intended to include the plural forms as well, unless the context clearly indicates otherwise.

It should be further understood that the terms "comprise", "include", "have", etc. used in this specification specify the presence of stated features, integers, steps, operations, elements, components, or combinations thereof but do not preclude the presence or addition of one or more other features, integers, steps, operations, elements, components, and/or combinations thereof.

A controller may include a communication device that communicates with another controller or a sensor to control a desired function, a memory that stores an operating system, logic command or input/output information, and one or more processors that perform decision, calculation, determination, etc. required for controlling a desired function. When a component, device, element, or the like of the present disclosure is described as having a purpose or performing an operation, function, or the like, the component, device, or element should be considered herein as being "configured to" meet that purpose or to perform that operation or function.

Figure 1:
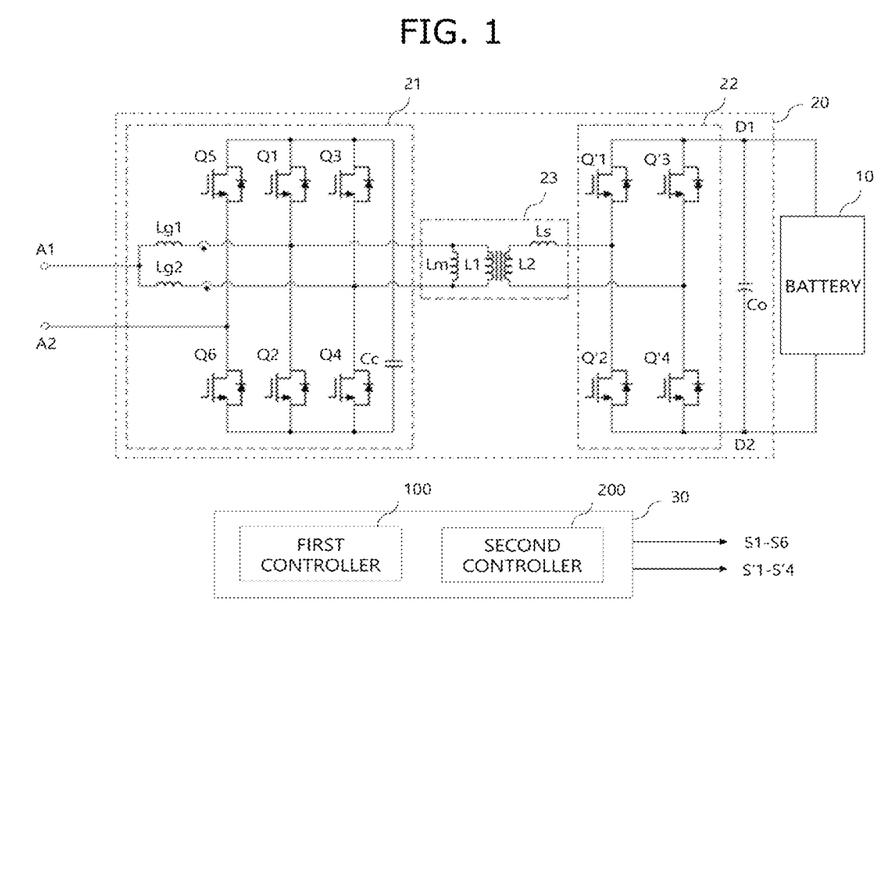
FIG. 1 is a diagram illustrating an example of a battery charging apparatus according to an embodiment of the present disclosure.

FIG. 1 is a diagram illustrating an example of a battery charging apparatus according to an embodiment of the present disclosure. As shown in FIG. 1, the battery charging apparatus may include a battery 10, a bi-directional charger 20, and a control unit 30.

The bi-directional charger 20 may have AC terminals A1 and A2 connected to a system power source or an AC load and may have DC terminals D1 and D2 connected to both ends of the battery 10. The bi-directional charger 20 may perform a charging mode in which the AC voltage of the system power source is converted into a DC voltage to charge the battery 10 when the vehicle is stopped. The bi-directional charger 20 may also perform a discharging mode in which the voltage of the battery 10 is converted into the AC voltage to output the AC voltage to the outside. The discharging mode may include a Vehicle to grid (V2G) mode in which the power of the battery 10 is supplied to the system power source when the vehicle is stopped. The discharging mode may also include a Vehicle to Load (V2L) mode in which the power of the battery 10 is supplied to the AC load when the vehicle is driven.

The bi-directional charger 20 includes a first switching circuit 21 connected to the AC terminals A1 and A2 and includes a second switching circuit 22 connected to the DC terminals D1 and D2. In order to electrically insulate the AC terminals A1 and A2 from the DC terminals D1 and D2, a transformer 23 connected between the first switching circuit 21 and the second switching circuit 22 may be included. The transformer 23 includes a primary coil L1, a secondary coil L2, a magnetizing inductor Lm, and a leakage inductor Ls and may convert a current and a voltage depending on the winding ratio of the primary coil L1 to the secondary coil L2.

The first switching circuit 21 may include a plurality of legs Q1-Q2, Q3-Q4, and Q5-Q6, input inductors Lg1 and Lg2, and a clamp capacitor Cc. The leg Q1-Q2 may be connected to the AC terminal A1 through the input inductor Lg1 and may be connected to one end of the primary coil L1 of the transformer 23. The leg Q3-Q4 may be connected to the AC terminal A1 through the input inductor Lg2 and may be connected to the other end of the primary coil L1 of the transformer 23. The leg Q5-Q6 may be connected to the AC terminal A2, and the clamp capacitor Cc may be connected between both ends of each of the plurality of legs Q1-Q2, Q3-Q4, and Q5-Q6. In this embodiment, a leg means a configuration in which a plurality of switch elements are connected, and each of the switch elements may be implemented as a transistor.

The second switching circuit 22 may include a leg Q'1-Q'2 and a leg Q'3-Q'4 to form the structure of a Dual Active Bridge (DAB) with the leg Q1-Q2 and the leg Q3-Q4 of the first switching circuit 21. The leg Q'1-Q'2 and the leg Q'3-Q'4 may be connected between the DC terminals D1 and D2, the leg Q'1-Q'2 may be connected to one end of the secondary coil L2 of the transformer 23, and the leg Q'3-Q'4 may be connected to the other end of the secondary coil L2 of the transformer 23. An output capacitor Co may be connected between DC terminals D1 and D2.

The bi-directional charger 20 according to this embodiment is implemented as a Power Factor Correction circuit (PFC) without a DC/DC converter and thus may reduce elements and an area consumed by the bi-directional charger 20.

The control unit 30 may include a first controller 100 that controls the performance of the charging mode and the V2G mode and include a second controller 200 that controls the performance of the V2L mode. The control unit 30 may output first switching signals S1-S6 for switching the leg included in the first switching circuit 21 and may output second switching signals S'1-S'4 for switching the leg included in the second switching circuit 22. The first switching signals S1-S6 may correspond to the switch elements Q1-Q6 included in the first switching circuit 21, respectively, and the second switching signals S'1-S'4 may correspond to the switch elements Q'1-Q'4 included in the second switching circuit 22, respectively. In this embodiment, the expression "the leg is switched" means that the plurality of switch elements included in the leg is complementarily switched.

To be more specific, the control unit 30 may switch the leg Q1-Q2 and the leg Q3-Q4 included in the first switching circuit 21 to a high frequency through an interleaving method with a 180° phase difference. The control unit 30 may also switch the leg Q5-Q6 included in the first switching circuit 21 for a synchronous rectification control in synchronization with a set frequency (low frequency) of the system power source or AC load.

Further, the control unit 30 may control an active power component in the apparent power of the bi-directional charger 20, by switching the legs Q'1-Q'2 and Q'3-Q'4 included in the second switching circuit 22 through the phase-shift control method. The phase-shift control method according to this embodiment means a method in which the switching phase of the legs Q'1-Q'2 and Q'3-Q'4 included in the second switching circuit 22 compared to the switching phase of the legs Q1-Q2 and Q3-Q4 included in the first switching circuit 21 is adjusted by the phase shift angle according to the active power command. Here, the switching frequency of the legs Q1-Q2 and Q3-Q4 included in the first switching circuit 21 and the switching frequency of the legs Q'1-Q'2 and Q'3-Q'4 included in the second switching circuit 22 may be set to be the same as each other.

Meanwhile, the phase-shift control method may control the active power component by adjusting the magnitude and direction of current for the AC terminals A1 and A2. However, since the phase of the current for the AC terminals A1 and A2 compared to the voltage for the AC terminals A1 and A2 may not be adjusted, the reactive power component may not be controlled.

Therefore, this embodiment proposes a battery charging apparatus that controls the active power component through the phase shift control method and controls the reactive power component by adjusting the phase of the duty command indicating the switching duty of the leg included in the second switching circuit 22 according to the reactive power command.

An operation in which the control unit 30 controls the active power component and reactive power component of the bi-directional charger 20 is described with reference to FIG. 2.

Figure 2:
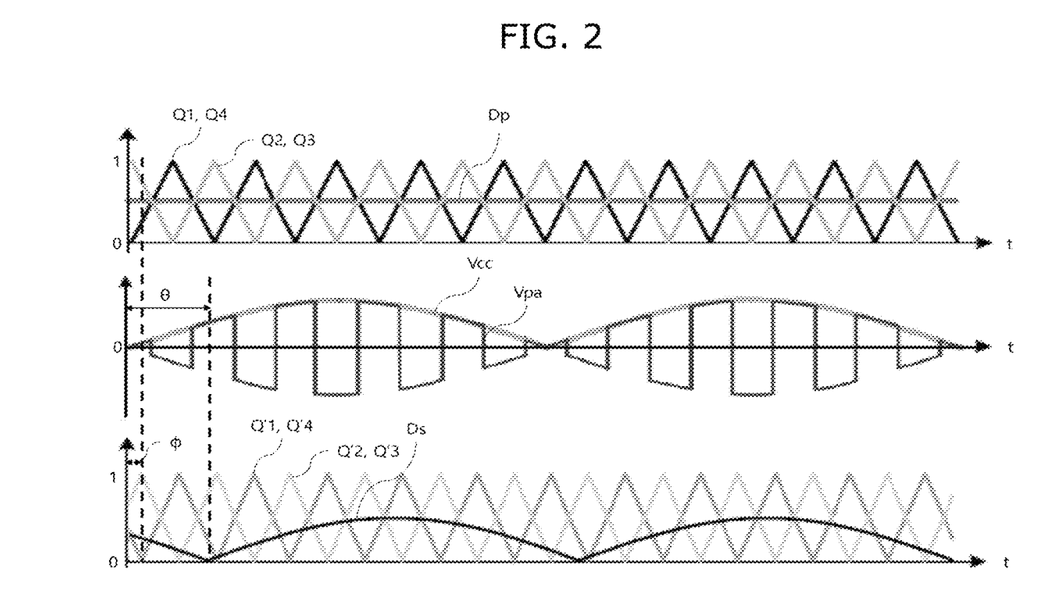
FIG. 2 is a diagram for explaining a process in which a control unit controls the active power component and the reactive power component of a bi-directional charger, according to an embodiment of the present disclosure.

FIG. 2 is a diagram for explaining a process in which the control unit 30 controls the active power component and the reactive power component of the bi-directional charger 20, according to an embodiment of the present disclosure.

Referring to the upper part of FIG. 2, a carrier wave for each of the switch elements Q1 and Q4 and the switch elements Q2 and Q3 included in the first switching circuit 21 and a first duty command Dp indicating a switching duty of a leg included in the first switching circuit 21 are shown. The value of the first duty command Dp may be set to a constant between 0 and 1.

Referring to the middle part of FIG. 2, a voltage Vcc of a clamp capacitor Cc included in the first switching circuit 21 and an output voltage Vpa of the first switching circuit 21 are shown. The phase of the voltage Vcc for the clamp capacitor Cc may be synchronized with the voltage of the AC terminal through the synchronous rectification control.

Referring to the lower part of FIG. 2, a carrier wave for each of the switch elements Q'1 and Q'4 and the switch elements Q'2 and Q'3 included in the second switching circuit 22 and a second duty command Ds indicating a switching duty of a leg included in the second switching circuit 22 are shown.

The control unit 30 may adjust the phase of the carrier wave for the switch elements Q'1 and Q'4 and the switch elements Q'2 and Q'3 compared to the phase of the carrier wave for the switch elements Q1 and Q4 and the switch elements Q2 and Q3 by a phase shift angle $\phi$. Thus, the control unit 30 may control the active power component of the bi-directional charger 20, by adjusting the magnitude and direction of current for the AC terminal. To be more specific, the control unit 30 may set the polarity of the phase shift angle $\phi$ to be positive when the charging mode is performed and may set the phase shift angle $\phi$ to be large as the value of the active power command increases. In contrast, the control unit 30 may set the polarity of the phase shift angle $\phi$ to be negative when the discharging mode is performed and may set the phase shift angle $\phi$ to be large as the value of the active power command decreases.

Further, the control unit 30 may control the phase of the current for the AC terminal compared to the voltage for the AC terminal, by adjusting the phase of the second duty command Ds by a voltage-current phase angle $\theta$ according to the reactive power command. Thus, the control unit 30 may control the reactive power component of the bi-directional charger 20. To be more specific, the control unit 30 may set the polarity of the voltage-current phase angle $\theta$ to be positive according to an inductive reactive power command and may set the polarity of the voltage-current phase angle $\theta$ to be negative according to a capacitive reactive power command.

Meanwhile, in the case of adjusting the phase of the second duty command Ds by the voltage-current phase angle $\theta$ according to the reactive power command, current for the AC terminal may have an unstable waveform as the polarity of instantaneous power for the AC terminal is changed due to the reactive power component.

In this embodiment, the control unit 30 may set the polarity of the phase shift angle $\phi$ according to the active power command to be the same as the polarity of the instantaneous power for the AC terminal of the bi-directional charger 20. Thus, the controller 30 may alleviate the instability of current generated when the phase of the second duty command Ds is adjusted based on the reactive power command.

In one embodiment, the control unit 30 may set the polarity of the phase shift angle $\phi$ to be positive when the charging mode is performed and may inverse the polarity of the phase shift angle $\phi$ to be negative when the polarity of the instantaneous power for the AC terminal is negative. Further, the control unit 30 may set the polarity of the phase shift angle $\phi$ to be negative when the discharging mode (V2L mode or V2G mode) is performed and may inverse the polarity of the phase shift angle ϕ to be positive when the polarity of the instantaneous power for the AC terminal is positive.

Hereinafter, the configuration and the operation of each of a first controller 100 and a second controller 200 included in the control unit 30 are described in detail.

Figure 3:
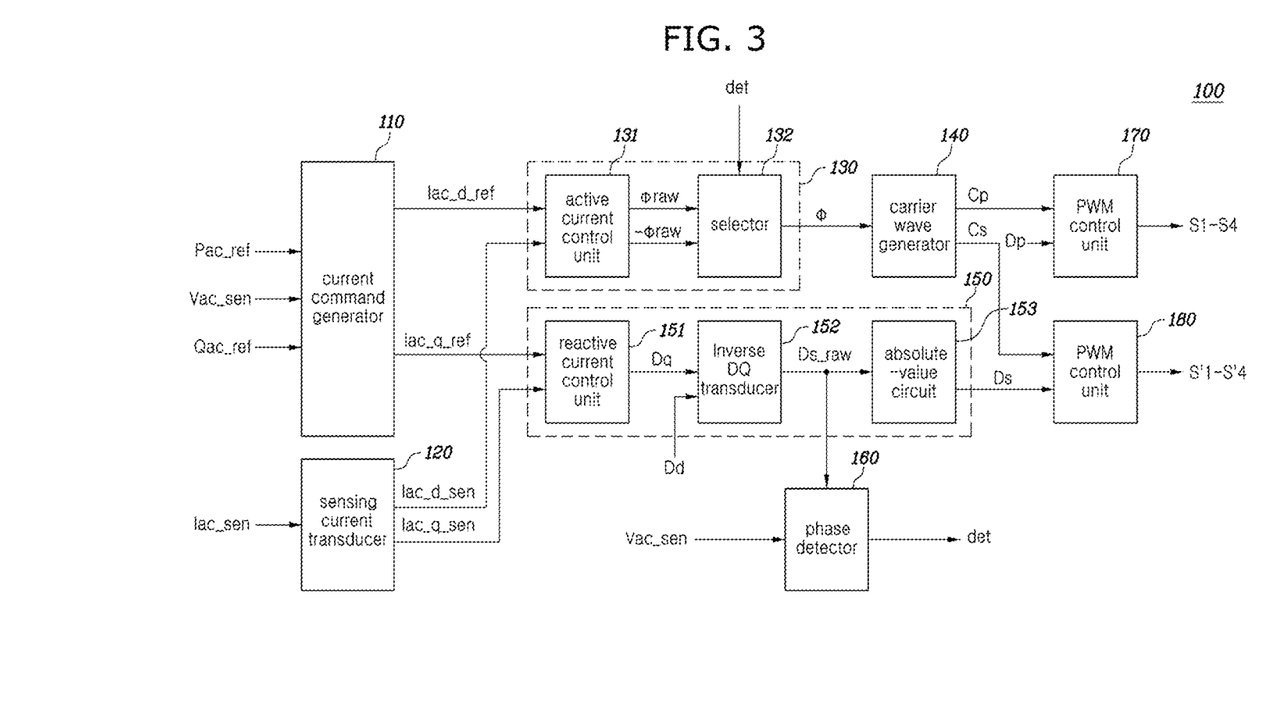
FIG. 3 is a block diagram illustrating the configuration of a first controller that controls the performance of a charging mode and a Vehicle to Grid (V2G) mode, according to an embodiment of the present disclosure.

FIG. 3 is a block diagram illustrating the configuration of the first controller 100 that controls the performance of the charging mode and the V2G mode, according to an embodiment of the present disclosure.

As shown in FIG. 3, the first controller 100 may include a current command generator 110, a sensing current transducer 120, a phase-shift-angle setting unit 130, a carrier wave generator 140, a voltage-current phase control unit 150, a phase detector 160, a first pulse-width-modulation (PWM) control unit 170, and a second pulse-width-modulation control unit 180.

The first controller 100 may output first switching signals S1-S4 and second switch signals S'1-S'4, based on an active power command Pac_ref, a reactive power command Qac_ref, a sensing voltage Vac_sen, and a sensing current Iac_sen, in the charging mode or the V2G mode.

The active power command Pac_ref and the reactive power command Qac_ref may be applied from an external charging station connected to a system power source when the charging mode or the V2G mode is performed, and the sensing voltage Vac_sen and the sensing current Iac_sen may be applied from a sensor (not shown) that senses the voltage and current of the AC terminals A1 and A2.

The first switching signals S1-S4 may be generated based on the first carrier wave Cp and the first duty command Dp, and the second switching signals S'1-S'4 may be generated based on the second carrier wave Cs and the second duty command Ds.

Hereinafter, each of components of the first controller 100 is described.

The current command generator 110 may generate an active current command Iac_d_ref based on the active power command Pac_ref and the sensing voltage Vac_sen and may generate a reactive current command Iac_q_ref based on the reactive power command Qac_ref and the sensing voltage Vac_sen.

The sensing current transducer 120 may perform DQ transformation for the sensing current Iac_sen to output the sensing active current Iac_d_sen and the sensing reactive current Iac_q_sen. The DQ transformation may involve Clarke transformation and Park transformation that are sequentially performed.

The phase-shift-angle setting unit 130 may include an active current control unit 131 and a selector 132. The phase-shift-angle setting unit 130 may control the active power component of the bi-directional charger 20, by setting the phase shift angle ϕ so that the sensing active current Iac_d_sen follows the active current command Iac_d_ref.

Further, the phase-shift-angle setting unit 130 may inverse the polarity of the phase shift angle ϕ based on an activated detection signal det, when the polarity of the instantaneous power for the AC terminal varies due to the reactive power component (i.e., when the polarity of the instantaneous power is negative in the charging mode or when the polarity of the instantaneous power is positive in the discharging mode). In other words, the phase-shift-angle setting unit 130 may set the polarity of the phase shift angle ϕ to be the same as the polarity of the instantaneous power for the AC terminal. Thus, the phase-shift-angle setting unit 130 may alleviate the instability of current generated when the phase of the second duty command Ds is adjusted based on the reactive power command.

The active current control unit 131 may set a pre-phase shift angle ϕ_raw so that the sensing active current Iac_d_sen follows the active current command Iac_d_ref and may inverse the polarity of the set pre-phase shift angle ϕ_raw to output an inverted phase shift angle −ϕ_raw. The polarity of the pre-phase shift angle ϕ_raw may be set to be positive when the charging mode is performed and may be set to be negative when the V2G mode is performed.

The selector 132 may output one of the pre-phase shift angle ϕ_raw and the inverted phase shift angle −ϕ_raw as the phase shift angle ϕ depending on whether the detection signal det is activated. To be more specific, the selector 132 may output the pre-phase shift angle ϕ_raw as the phase shift angle ϕ when the detection signal det is deactivated and may output the inverted phase shift angle −ϕ_raw as the phase shift angle ϕ when the detection signal det is activated.

The carrier wave generator 140 may oscillate the first carrier wave Cp and the second carrier wave Cs with the same frequency and may adjust the phase of the second carrier wave Cs compared to the phase of the first carrier wave Cp by the phase shift angle ϕ.

The voltage-current phase control unit 150 may include a reactive current control unit 151, an inverse DQ transducer 152, and an absolute-value circuit 153. The voltage-current phase control unit 150 may control the reactive power component of the bi-directional charger 20, by adjusting the phase of the second duty command Ds such that the sensing reactive current Iac_q_sen follows the reactive current command Iac_q_ref.

The reactive current control unit 151 may generate a quadrature axis duty command Dq so that the sensing reactive current Iac_q_sen follows the reactive current command Iac_q_ref.

The inverse DQ transducer 152 may perform inverse DQ transformation for the direct-axis duty command Dd and the quadrature-axis duty command Dq to generate a pre-duty command Ds_raw. The inverse DQ transformation may involve Park inverse transformation and Clarke inverse transformation that are sequentially performed. The value of the direct-axis duty command Dd may be set to a constant between 0 and 1. The pre-duty command Ds_raw may indicate a phase difference between the voltage of the AC terminal and the current of the AC terminal regardless of the charging mode and the discharging mode.

The absolute-value circuit 153 may receive the pre-duty command Ds_raw to generate the second duty command Ds having the absolute value of the pre-duty command Ds_raw.

A phase detector 160 may generate the detection signal det for controlling such that the polarity of the phase shift angle ϕ is the same as the polarity of the instantaneous power, by comparing the polarity of the sensing voltage Vac_sen and that of the pre-duty command Ds_raw.

To be more specific, the phase detector 160 may deactivate the detection signal det, when the polarity of the sensing voltage Vac_sen is the same as that of the pre-duty command Ds_raw (i.e. when the polarity of the instantaneous power for the AC terminal is positive in the charging mode or when the polarity of the instantaneous power for the AC terminal is negative in the discharging mode). Thus, the selector 132 may output the pre-phase shift angle ϕ_raw as the phase shift angle ϕ.

In contrast, the phase detector 160 may activate the detection signal det, when the polarity of the sensing voltage Vac_sen is different from that of the pre-duty command Ds_raw due to the reactive power component (i.e. when the polarity of the instantaneous power for the AC terminal is negative in the charging mode or when the polarity of the instantaneous power for the AC terminal is positive in the discharging mode). Thus, the selector 132 may output the inverted phase shift angle −φ_raw as the phase shift angle φ.

The first pulse-width-modulation control unit 170 may determine the logic level of the first switching signals S1-S4 according to the result of comparing the first carrier wave Cp and the first duty command Dp.

The second pulse-width-modulation control unit 180 may determine the logic level of the second switching signals S'1-S'4 according to the result of comparing the second carrier wave Cs and the second duty command Ds.

Figure 4:
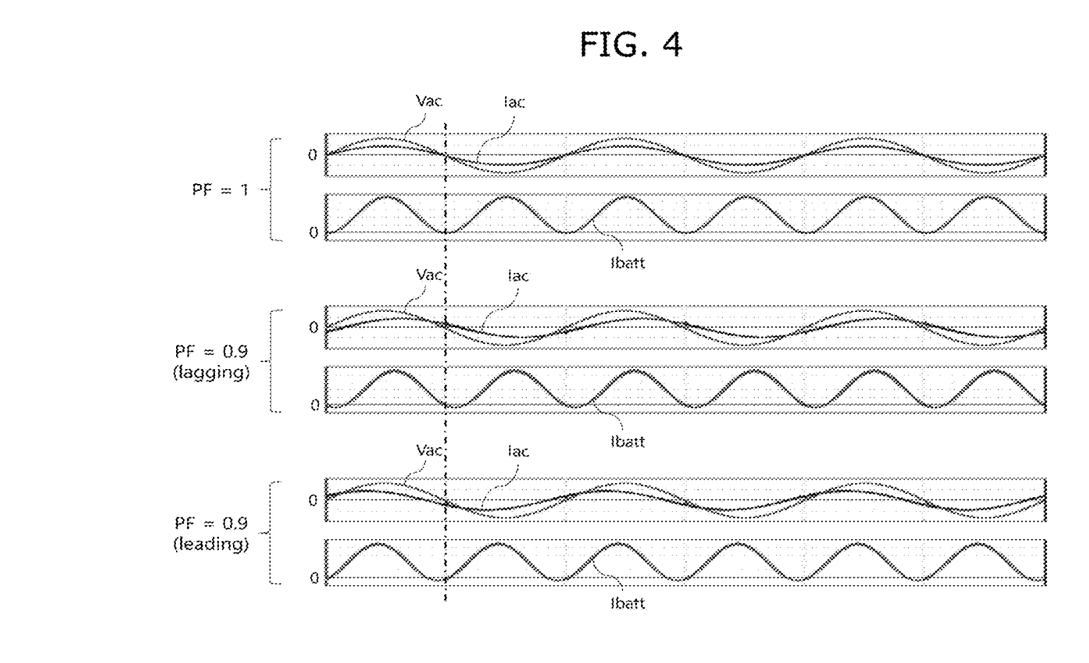
FIGS. 4 and 5 are waveform diagrams of current and voltage of the bi-directional charger when the first controller controls the active power component and the reactive power component, according to an embodiment of the present disclosure.
Figure 5:
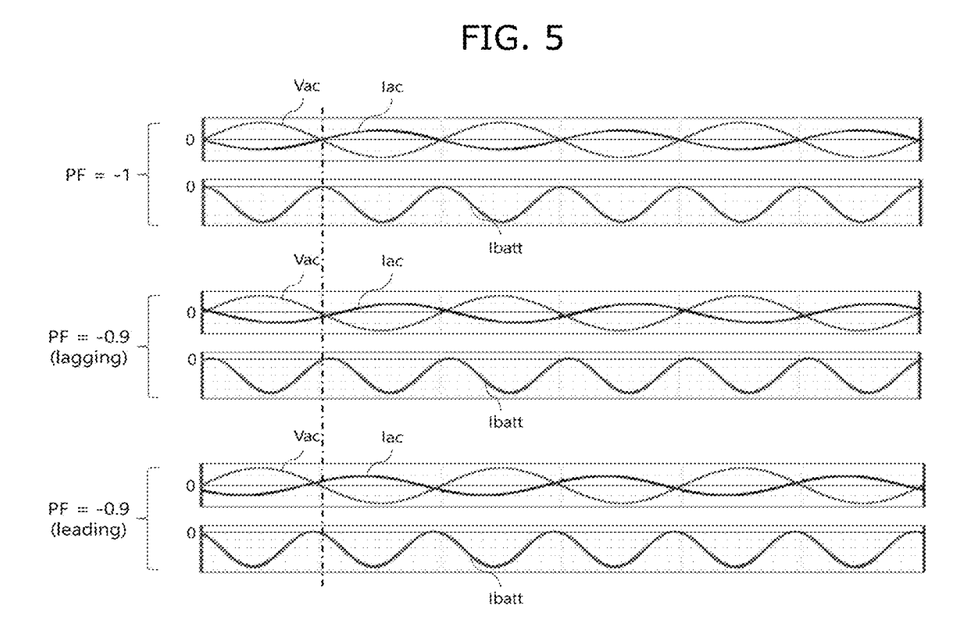

FIGS. 4 and 5 are waveform diagrams of current and voltage of the bi-directional charger 20 when the first controller 100 controls the active power component and the reactive power component, according to an embodiment of the present disclosure. FIG. 4 corresponds to a case where the charging mode is performed, and FIG. 5 corresponds to a case where the V2G mode is performed.

FIG. 4 shows waveforms for the voltage Vac of the AC terminal, the current Iac of the AC terminal, and the current Ibatt of the battery 10 corresponding to a case where the first controller 100 according to this embodiment controls only the active power component in the charging mode (Power Factor=1), a case where it controls the active power component and the inductive reactive power component (Lagging Power Factor=0.9), and a case where it controls the active power component and the capacitive reactive power component (Leading Power Factor=0.9).

FIG. 5 shows waveforms for the voltage Vac of the AC terminal, the current Iac of the AC terminal, and the current Ibatt of the battery corresponding to a case where the first controller 100 according to this embodiment controls only the active power component in the V2G mode (Power Factor=−1), a case where it controls the active power component and the inductive reactive power component (Lagging Power Factor=−0.9), and a case where it controls the active power component and the capacitive reactive power component (Leading Power Factor=−0.9).

Figure 6:
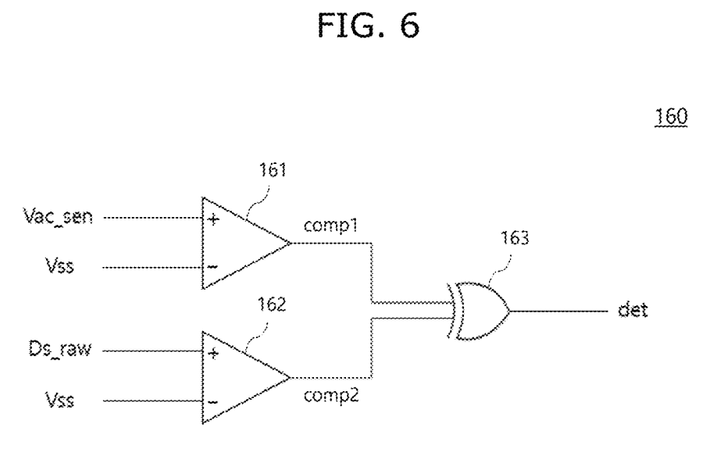
FIG. 6 is a circuit diagram according to an embodiment of a phase detector shown in FIG. 3.

FIG. 6 is a circuit diagram according to an embodiment of the phase detector 160 shown in FIG. 3. As shown in FIG. 6, the phase detector 160 may include a first comparator 161, a second comparator 162, and an XOR gate 163.

The first comparator 161 and the second comparator 162 may compare the levels of the sensing voltage Vac_sen and the pre-duty command Ds_raw with the level of a ground voltage Vss to output comparison result signals comp1 and comp2. The comparison result signals comp1 and comp2 may have the same logic level, when the polarity of the sensing voltage Vac_sen is the same as that of the pre-duty command Ds_raw. In contrast, the comparison result signals comp1 and comp2 may have different logic levels, when the polarity of the sensing voltage Vac_sen is different from that of the pre-duty command Ds_raw.

When the comparison result signals comp1 and comp2 of the XOR gate 163 have the same logic level, the detection signal det may be deactivated to a logic low level. When the comparison result signals comp1 and comp2 have different logic levels, the detection signal det may be activated to a logic high level.

Figure 7:
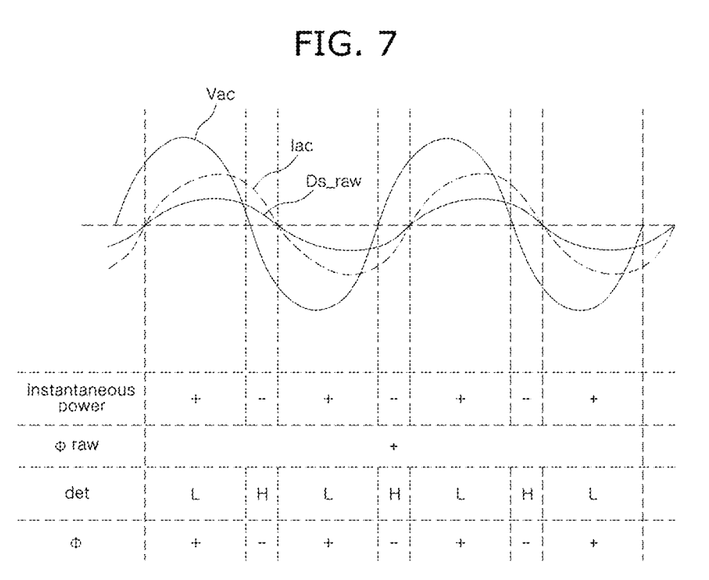
FIGS. 7 and 8 are diagrams for explaining the operation of the phase detector shown in FIG. 3.
Figure 8:
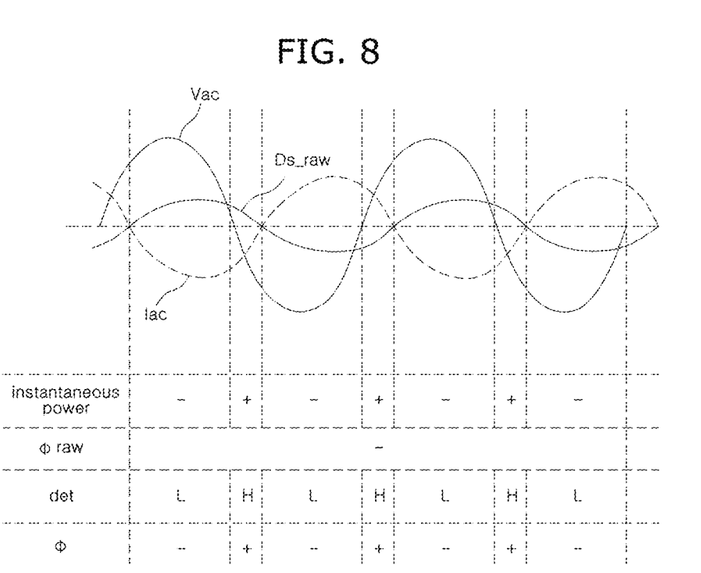

FIGS. 7 and 8 are diagrams for explaining the operation of the phase detector 160 shown in FIG. 3. FIG. 7 corresponds to a case where the charging mode is performed, and FIG. 8 corresponds to a case where the discharging mode is performed.

Referring to FIGS. 7 and 8, it can be seen that the pre-duty command Ds_raw represents a phase difference between the voltage Vac of the AC terminal and the current Iac of the AC terminal regardless of the charging mode and the discharging mode.

Referring to FIG. 7, when the charging mode is performed, the pre-phase shift angle φ_raw corresponds to a positive (+) value. The polarity of the phase shift angle φ may be set to be the same as the pre-phase shift angle φ_raw when the polarity of the instantaneous power of the AC terminal corresponds to a positive (+) value but may be set to be different from the pre-phase shift angle φ_raw when the polarity of the instantaneous power of the AC terminal corresponds to a negative (−) value.

Referring to FIG. 8, when the discharging mode is performed, the pre-phase shift angle φ_raw corresponds to a negative (−) value. The polarity of the phase shift angle φ may be set to be the same as the pre-phase shift angle φ_raw when the polarity of the instantaneous power of the AC terminal corresponds to a negative (−) value but may be set to be different from the pre-phase shift angle φ_raw when the polarity of the instantaneous power of the AC terminal corresponds to a positive (+) value.

Figure 9:
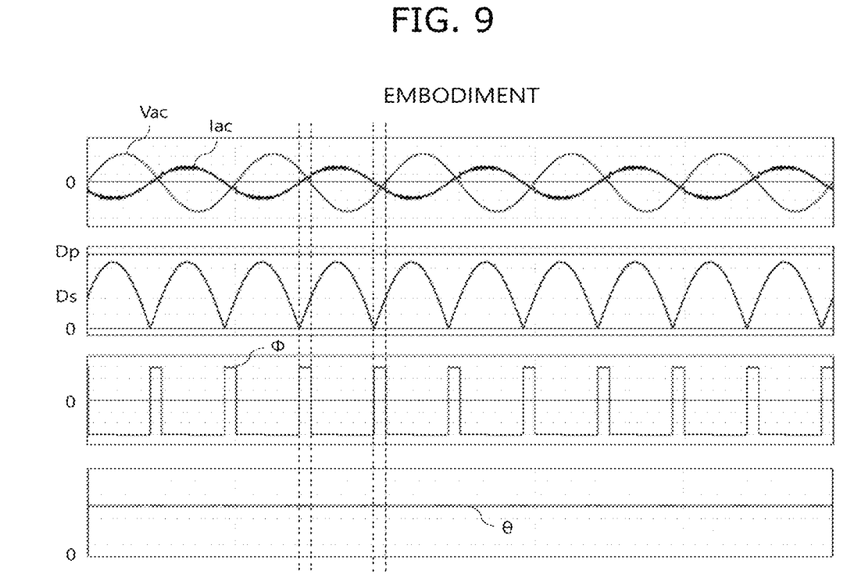
FIGS. 9 and 10 are waveform diagrams for explaining the operation of inversing the polarity of a phase shift angle when controlling the reactive power component, according to an embodiment of the present disclosure.
Figure 10:
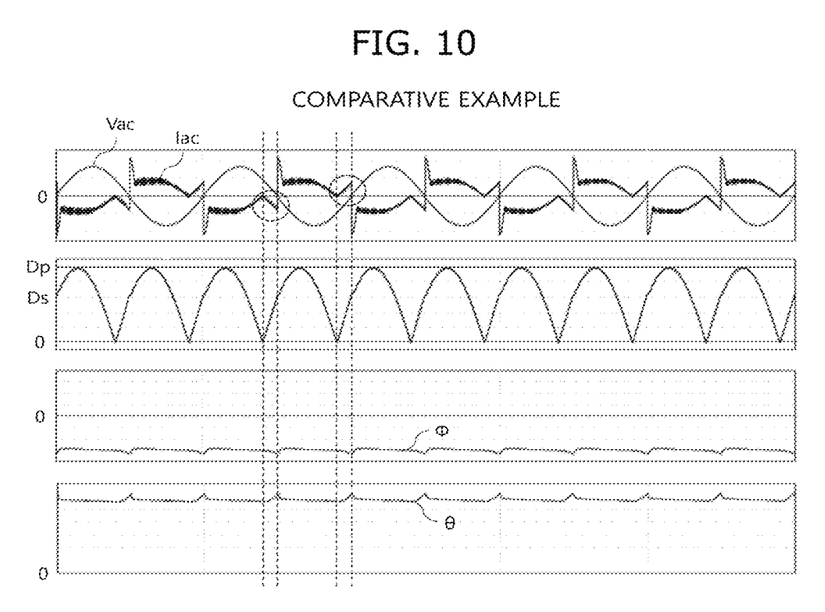

FIGS. 9 and 10 are waveform diagrams for explaining the operation of inversing the polarity of the phase shift angle φ when controlling the reactive power component, according to an embodiment of the present disclosure. FIG. 9 shows an embodiment in which the operation of inversing the polarity of the phase shift angle φ is performed when controlling the reactive power component. FIG. 10 shows a comparative example in which the operation of inversing the polarity of the phase shift angle φ is not performed when controlling the reactive power component unlike this embodiment.

FIGS. 9 and 10 show the waveforms of the voltage Vac of the AC terminal, the current Iac of the AC terminal, the first duty command Dp, the second duty command Ds, the phase shift angle φ, and the voltage-current phase angle θ when the inductive reactive power component is controlled in the discharging mode.

Referring to FIG. 9, it can be seen that, when the polarities of the voltage Vac and the current Iac of the AC terminal are the same as each other (i.e. the polarity of the instantaneous power corresponds to a positive value), the waveform of the current Iac of the AC terminal is stably created as the polarity of the phase shift angle φ is inversed.

Referring to FIG. 10, unlike this embodiment, if the polarity of the phase shift angle φ is maintained when polarities of the voltage Vac and the current Iac of the AC terminal are the same as each other, it can be seen that the waveform of the current Iac of the AC terminal is unstable.

Figure 11:
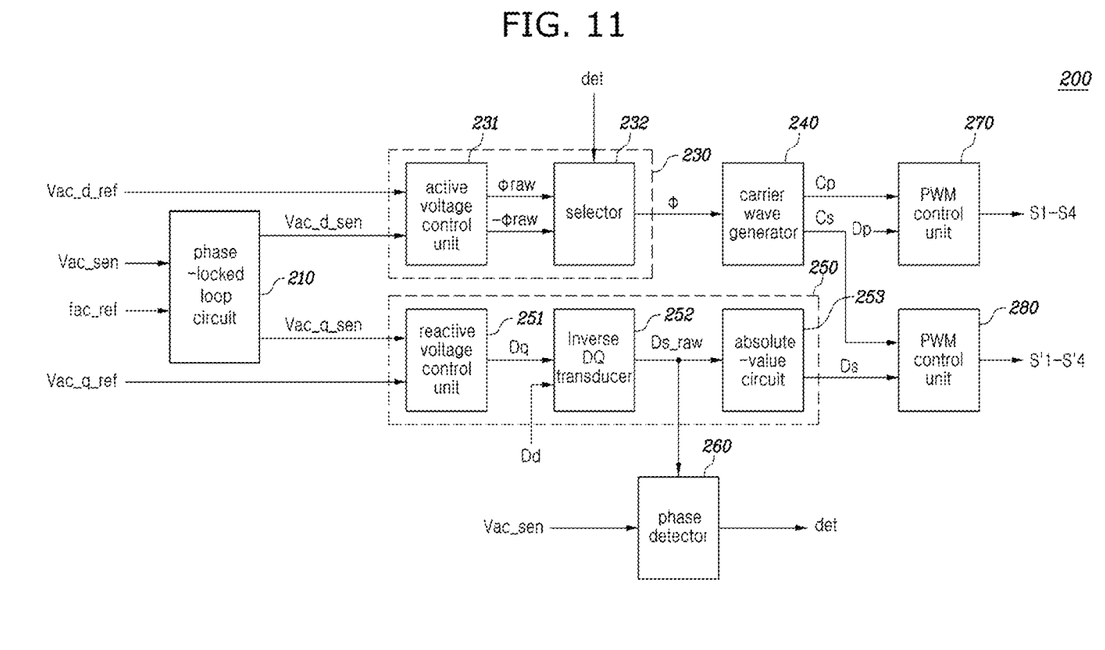
FIG. 11 is a block diagram illustrating the configuration of a second controller that controls the performance of a Vehicle to Load (V2L) mode, according to an embodiment of the present disclosure.

FIG. 11 is a block diagram illustrating the configuration of the second controller 200 that controls the performance of the V2L mode, according to an embodiment of the present disclosure.

As shown in FIG. 11, the second controller 200 may include a phase-locked loop circuit 210, a phase-shift-angle setting unit 230, a carrier wave generator 240, a voltage-current phase control unit 250, a phase detector 260, a first pulse-width-modulation control unit 270, and a second pulse-width-modulation control unit 280.

The second controller 200 may output the first switching signals S1-S4 and the second switch signals S'1-S'4, based on the active voltage command Vac_d_ref, the reactive voltage command Vac_q_ref, the frequency command fac_ref, and the sensing voltage Vac_sen in the V2L mode.

The active voltage command Vac_d_ref, the reactive voltage command Vac_q_ref, and the frequency command fac_ref are applied from an upper level controller (not shown) that controls the second controller 200 such as a vehicle controller (VCU) or a vehicle charging management system (VCMS) when the V2L mode is performed. The sensing voltage Vac_sen may be applied from a sensor (not shown) that detects the voltage of the AC terminals A1 and A2.

The phase-locked loop circuit 210 may generate the sensing active voltage Vac_d_sen and the sensing reactive voltage Vac_q_sen from the sensing voltage Vac_sen, based on the frequency command fac_ref.

The phase-shift-angle setting unit 230 may include an active voltage control unit 231 and a selector 232. The operating method of the phase-shift-angle setting unit 230 may be implemented in the same manner as the operating method of the phase-shift-angle setting unit 130 shown in FIG. 3. The active voltage command Vac_d_ref may correspond to the active current command Iac_d_ref of FIG. 3. The sensing active voltage Vac_d_sen may correspond to the sensing active current Iac_d_sen of FIG. 3.

The voltage-current phase control unit 250 may include a reactive voltage control unit 251, an inverse DQ transducer 252, and an absolute-value circuit 253. The operating method of the voltage-current phase control unit 250 may be implemented in the same manner as the operating method of the voltage-current phase control unit 150 shown in FIG. 3. The reactive voltage command Vac_q_ref may correspond to the reactive current command Iac_q_ref of FIG. 3. The sensing reactive voltage Vac_q_sen may correspond to the sensing reactive current Iac_q_sen of FIG. 3.

A carrier wave generator 240, a voltage-current phase control unit 250, a phase detector 260, a first pulse-width-modulation control unit 270, and a second pulse-width-modulation control unit 280 may be implemented in the same manner as the carrier wave generator 140, the voltage-current phase control unit 150, the phase detector 160, the first pulse-width-modulation control unit 170, and the second pulse-width-modulation control unit 180, respectively.

Figure 12:
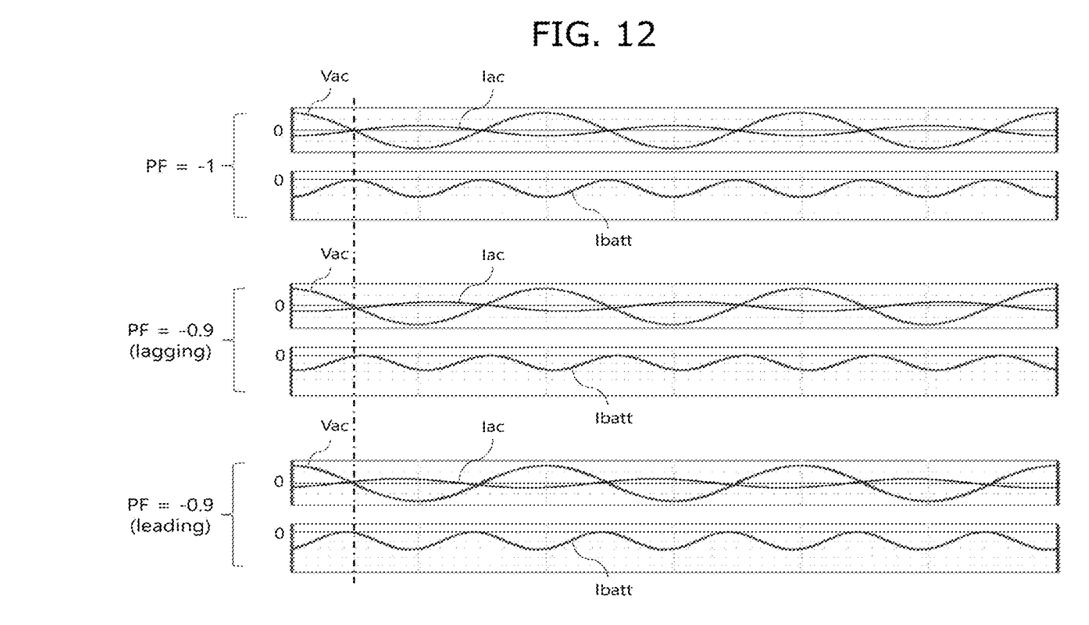
FIG. 12 is a waveform diagram of current and voltage of the bi-directional charger when the second controller controls the active power component and the reactive power component, according to an embodiment of the present disclosure.

FIG. 12 is a waveform diagram of current and voltage of the bi-directional charger 20 when the second controller 200 controls the active power component and the reactive power component in the V2L mode, according to an embodiment of the present disclosure.

FIG. 12 shows waveforms for the voltage Vac of the AC terminal, the current Iac of the AC terminal, and the current Ibatt of the battery 10 when the second controller 200 according to this embodiment controls only the active power component in the V2L mode (Power Factor=−1), when it controls the active power component and the inductive reactive power component (inductive load) (Lagging Power Factor=−0.9), and when it controls the active power component and the capacitive reactive power component (capacitive load) (Leading Power Factor=−0.9).

On the other hand, the present disclosure may be implemented as a computer-readable code on a medium in which a program is recorded. The computer readable medium includes all kinds of recording devices in which data readable by a computer system is stored. Examples of the computer readable medium include Hard Disk Drive (HDD), Solid State Disk (SSD), Silicon Disk Drive (SDD), ROM, RAM, CD-ROM, magnetic tape, floppy disk, optical data storage devices, etc. Therefore, the above detailed description should not be construed as being restrictive in all respects but as being illustrative. The scope of the present disclosure should be determined by the reasonable interpretation of the appended claims, and all modifications are included in the scope of the present disclosure within the equivalent scope of the present disclosure.

What is claimed is:

1. A battery charging apparatus comprising:
    a bi-directional charger including a first switching circuit connected to an AC terminal, a second switching circuit connected to a battery, and a transformer connected between the first switching circuit and the second switching circuit; and
    a controller configured to:
        switch a leg included in the first switching circuit based on a first carrier wave and a first duty command,
        switch a leg included in the second switching circuit based on a second carrier wave and a second duty command,
        adjust a phase of the second carrier wave compared to a phase of the first carrier wave by a phase shift angle according to an active power command, and
        adjust a phase of the second duty command according to a reactive power command.

2. The battery charging apparatus of claim 1, wherein the active power command and the reactive power command are applied from an external device connected to a system power source, when a charging mode or a Vehicle to Grid (V2G) mode is performed.

3. The battery charging apparatus of claim 1, wherein the controller is configured to set a polarity of the phase shift angle to be the same as a polarity of instantaneous power for the AC terminal.

4. The battery charging apparatus of claim 3, wherein the controller is further configured to set the polarity of the phase shift angle to be positive when the charging mode is performed and configured to inverse the polarity of the phase shift angle when the polarity of the instantaneous power is negative, and
    wherein the controller is further configured to set the polarity of the phase shift angle to be negative when a discharging mode is performed and configured to inverse the polarity of the phase shift angle when the polarity of the instantaneous power is positive.

5. The battery charging apparatus of claim 1, wherein the controller is further configured to set a magnitude of the phase shift angle to be large as a value of the active power command is increased, when the charging mode is performed, and
    wherein the controller is further configured to set the magnitude of the phase shift angle to be large as the value of the active power command is reduced, when the discharging mode is performed.

6. The battery charging apparatus of claim 1, wherein the controller is further configured to control a magnitude and direction of current for the AC terminal by adjusting the phase shift angle based on the active power command.

7. The battery charging apparatus of claim 1, wherein the controller is further configured to control a phase of current for the AC terminal compared to a phase of voltage for the AC terminal by adjusting the phase of the second duty command by a voltage-current phase angle based on the reactive power command.

8. The battery charging apparatus of claim 1, wherein the first duty command indicates a switching duty of the leg included in the first switching circuit, and
    wherein the second duty command indicates a switching duty of the leg included in the second switching circuit, and a value of the first duty command is set to a constant.

9. The battery charging apparatus of claim 1, wherein the controller comprises:
- a current command generator configured to generate an active current command based on the active power command and a sensing voltage of the AC terminal and configured to generate a reactive current command based on the reactive power command and the sensing voltage;
- a phase-shift-angle setting unit configured to set the phase shift angle so that a sensing active current of the AC terminal follows the active current command; and
- a voltage-current phase control unit configured to adjust a phase of the second duty command so that a sensing reactive current of the AC terminal follows the reactive current command.

10. The battery charging apparatus of claim 9, wherein the phase-shift-angle setting unit comprises:
- an active current control unit configured to set a pre-phase shift angle so that the sensing active current follows the active current command and configured to inverse a polarity of the set pre-phase shift angle to output an inverted phase shift angle; and
- a selector configured to output the pre-phase shift angle as the phase shift angle when a detection signal is deactivated and configured to output the inverted phase shift angle as the phase shift angle when the detection signal is activated.

11. The battery charging apparatus of claim 10, wherein the detection signal is activated when the polarity of the instantaneous power for the AC terminal is negative in the charging mode, or when the polarity of the instantaneous power is positive in the discharging mode.

12. The battery charging apparatus of claim 10, wherein the voltage-current phase control unit comprises:
- a reactive current control unit configured to generate a quadrature-axis duty command so that the sensing reactive current of the AC terminal follows the reactive current command;
- an inverse DQ transducer configured to generate a pre-duty command by performing Inverse DQ transformation for a direct-axis duty command and the quadrature-axis duty command; and
- an absolute-value circuit configured to receive the pre-duty command to generate the second duty command having an absolute value of the pre-duty command,
- wherein the controller further comprises:
- a phase detector configured to generate the detection signal by comparing the polarity of the sensing voltage and that of the pre-duty command.

13. The battery charging apparatus of claim 12, wherein the phase detector is further configured to deactivate the detection signal when the polarity of the sensing voltage is the same as that of the pre-duty command and configured to activate the detection signal when the polarity of the sensing voltage is different from that of the pre-duty command.

14. The battery charging apparatus of claim 1, wherein the controller comprises:
- a carrier wave generator configured to oscillate the first carrier wave and the second carrier wave at the same frequency and configured to adjust the phase of the second carrier wave compared to the phase of the first carrier wave by the phase shift angle;
- a first pulse-width-modulation control unit configured to determine a logic level of a first switching signal for switching the leg included in the first switching circuit, based on a result of comparing the first carrier wave and the first duty command; and
- a second pulse-width-modulation control unit configured to determine a logic level of a second switching signal for switching the leg included in the second switching circuit, based on a result of comparing the second carrier wave and the second duty command.

15. The battery charging apparatus of claim 1, wherein the first switching circuit comprises:
- a clamp capacitor;
- a first leg connected between both ends of the clamp capacitor and connected to one end of a primary coil of the transformer;
- a second leg connected between both ends of the clamp capacitor and connected to the other end of the primary coil of the transformer; and
- a third leg connected between both ends of the clamp capacitor.

16. The battery charging apparatus of claim 1, wherein the second switching circuit comprises:
- a fourth leg connected between both ends of the battery, and connected to one end of a secondary coil of the transformer; and
- a fifth leg connected between both ends of the battery and connected to the other end of the secondary coil of the transformer.

17. A battery charging apparatus comprising:
- a bi-directional charger including a first switching circuit connected to an AC terminal, a second switching circuit connected to a battery, and a transformer connected between the first switching circuit and the second switching circuit; and
- a controller configured to:
  - switch a leg included in the first switching circuit based on a first carrier wave and a first duty command,
  - switch a leg included in the second switching circuit based on a second carrier wave and a second duty command,
  - adjust a phase of the second carrier wave compared to a phase of the first carrier wave by a phase shift angle according to an active voltage command, and
  - adjust a phase of the second duty command according to a reactive voltage command.

18. The battery charging apparatus of claim 17, wherein the active voltage command and the reactive voltage command are applied from an upper level controller controlling the controller, when a Vehicle to Load (V2L) mode is performed.

19. The battery charging apparatus of claim 17, wherein the controller is further configured to set a polarity of the phase shift angle to be the same as a polarity of instantaneous power for the AC terminal.

20. The battery charging apparatus of claim 17, wherein the controller comprises:
- a phase-locked loop circuit configured to generate a sensing active voltage and a sensing reactive voltage from the sensing voltage of the AC terminal, based on a frequency command;
- a phase-shift-angle setting unit configured to set the phase shift angle so that a sensing active voltage of the AC terminal follows the active voltage command; and
- a voltage-current phase control unit configured to adjust a phase of the second duty command so that a sensing reactive voltage of the AC terminal follows the reactive voltage command.

* * * * *